(No Model.)
T. W. CAIN.
CONCAVE BAND SAWING MACHINE.
No. 563,654. Patented July 7, 1896.
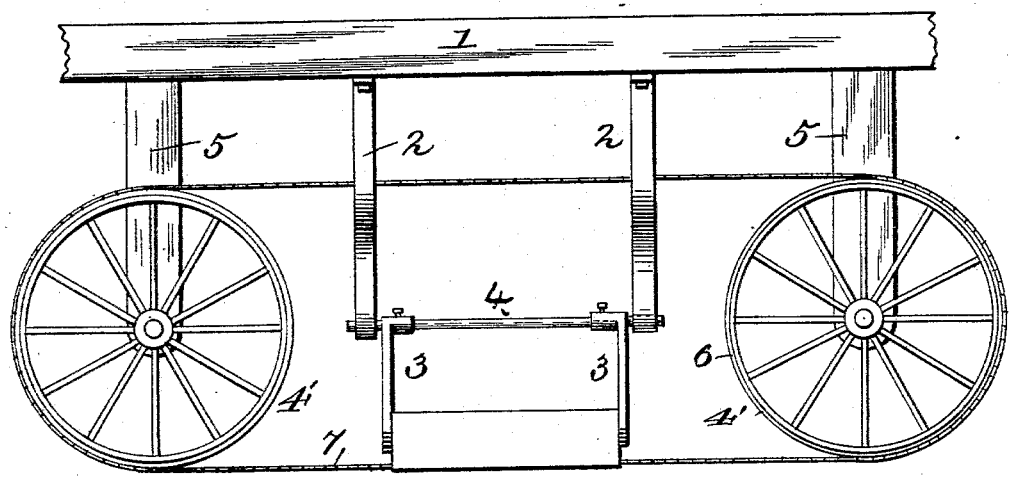
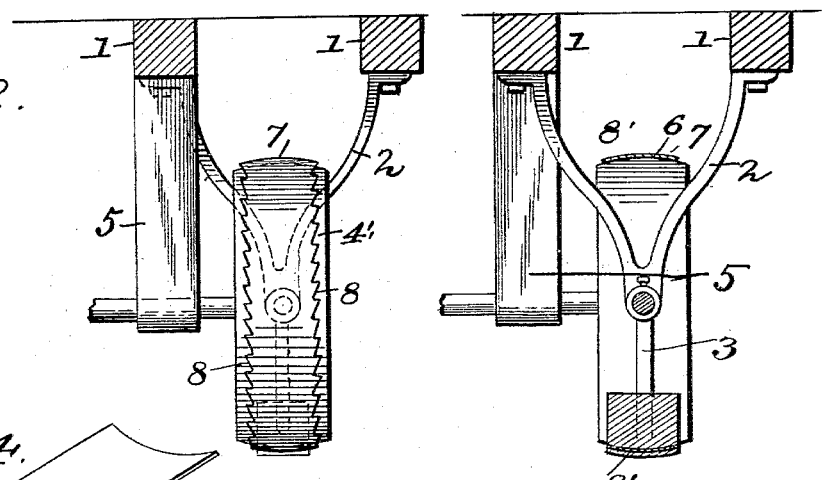
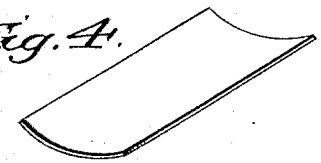
Witnesses
Inventor
Thomas W. Cain
By H. A. Wilbur
Attorney

UNITED STATES PATENT OFFICE.

THOMAS W. CAIN, OF SALAMANCA, NEW YORK.

CONCAVE BAND SAWING-MACHINE.

SPECIFICATION forming part of Letters Patent No. 563,654, dated July 7, 1896.

Application filed June 3, 1895. Renewed May 27, 1896. Serial No. 593,354. (No model.)

*To all whom it may concern:*

Be it known that I, THOMAS W. CAIN, a citizen of the United States, residing at Salamanca, in the county of Cattaraugus and State of New York, have invented certain new and useful Improvements in Concave Band Sawing-Machines; and I do declare the following to be a full, clear, and exact description of the invention, such as will enable others skilled in the art to which it appertains to make and use the same.

My invention relates to band-saws, and more particularly to devices of this character especially adapted for sawing barrel-staves.
The object of my invention is to provide a band-saw which will more rapidly and effectively saw barrel-staves and which shall be simple of construction, durable in use, and comparatively inexpensive of production.
With these objects in view the invention consists of certain features of construction and combination of parts which will be hereinafter fully described and claimed.

In the accompanying drawings, Figure 1 is a side elevation of the saw, its supporting-pulleys, and carriage. Fig. 2 is an end view of the same. Fig. 3 is a vertical sectional view through one of the supporting-pulleys and the saw. Fig. 4 is a detail perspective of one of the staves.

1 denotes an overhead beam or rafter having two depending brackets 2, to which is pivoted the carriage 3 by the shaft 4. The carriage may be of any well-known or improved construction, and as it in itself forms no part of my invention a further description of the same is not thought to be necessary.

4' denotes the supporting-pulleys, which may be suitably journaled, and which are shown in the present case as being journaled in the lower ends of the brackets 5, secured to the beam 1. The rims of these pulleys are concaved, as shown at 6.

The band-saw 7 is provided with teeth 8 on both of its edges and is concaved, as shown at 8', and is supported and driven by the pulleys 4'.

In operation the stave-bolt is secured to the carriage and the carriage is swung across the path of travel of the lower side of the saw, bringing the stave-bolt in contact with the teeth of the saw, which will saw off a stave. On the return movement of the carriage another stave will be sawed off the bolt. Owing to the fact that the movement of the carriage is in the same arc of a circle as the curvature of the saw, the staves will be given the proper dish and will be cut of a uniform thickness.

Having thus described my invention, what I claim, and desire to secure by Letters Patent, is—

The combination with a beam 1 having depending brackets 5, and the bifurcated brackets 2, of a carriage journaled in the lower ends of brackets 2, and adapted to swing in an arc of a circle transversely to the beam and in a position to enable the lower rim of the saw to operate upon the block, supporting-pulleys journaled in the lower ends of the brackets 5 and having convex peripheries, and a band concave saw mounted on said pulleys and traveling with its upper rim between the arms of the bifurcated brackets and having teeth at either edge, the arc of the circle within which the carriage swings transversely corresponding to the curvature of the saw, all as specified.

In testimony whereof I affix my signature in presence of two witnesses.

THOMAS W. CAIN.

Witnesses:
JOHN W. DAVIE,
F. E. FENTON.